United States Patent
Kapron et al.

(10) Patent No.: US 10,699,550 B2
(45) Date of Patent: Jun. 30, 2020

(54) STYLI

(71) Applicant: HEWLETT-PACKARD DEVELOPMENT COMPANY, L.P., Houston, TX (US)

(72) Inventors: Neill Thomas Kapron, Fort Collins, CO (US); Scott Michael Fehringer, Fort Collins, CO (US); Jeffrey Edward Leaming, Fort Collins, CO (US); George Hristov Gueorguiev, Fort Collins, CO (US); Andrew Stone Cifala, Fort Collins, CO (US); Ken Ogden, Fort Collins, CO (US); Lauren M. Domingo, Fort Collins, CO (US); Bruce E. Blaho, Fort Collins, CO (US); Fred Charles Thomas, III, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/098,108

(22) PCT Filed: Apr. 14, 2016

(86) PCT No.: PCT/US2016/027510
§ 371 (c)(1),
(2) Date: Oct. 31, 2018

(87) PCT Pub. No.: WO2017/180125
PCT Pub. Date: Oct. 19, 2017

(65) Prior Publication Data
US 2019/0139393 A1 May 9, 2019

(51) Int. Cl.
*G08B 21/18* (2006.01)
*G06F 3/0354* (2013.01)
(Continued)

(52) U.S. Cl.
CPC ............ *G08B 21/182* (2013.01); *B43K 29/00* (2013.01); *B43K 29/08* (2013.01); *G06F 3/016* (2013.01);
(Continued)

(58) Field of Classification Search
CPC ...... G08B 21/182; B43K 29/08; B43K 29/00; G06F 3/016; G06F 3/03545; G06F 3/0383; G06F 3/0418
See application file for complete search history.

(56) References Cited

U.S. PATENT DOCUMENTS 6,870,966 B1 * 3/2005 Silverbrook ......... B41J 2/17556
382/313
8,287,204 B2 * 10/2012 Silverbrook .......... G06F 3/0321
345/179

(Continued)

FOREIGN PATENT DOCUMENTS

| WO | WO-0131559 | 5/2001 |
| WO | WO-2008069776 | 6/2008 |
| WO | WO-2013158944 | 10/2013 |

*Primary Examiner* — Sardis F Azongha
(74) *Attorney, Agent, or Firm* — Hanley Flight & Zimmerman LLC

(57) ABSTRACT

Styli for generating alert notifications to prevent unintentional marking of interactive devices are disclosed. A disclosed stylus includes a housing and a processor. The housing is to interchangeably receive a physically marking nib and an electronic marking nib. The processor is carried by the housing. The processor is to determine a received nib is the physically marking nib. The processor is further to determine a distance between the stylus and an interactive device satisfies a threshold. The processor is further to generate an alert notification based on the received nib being the physically marking nib and the distance between the stylus and the interactive device satisfying the threshold.

19 Claims, 8 Drawing Sheets

(51) Int. Cl.
  *G06F 3/01*   (2006.01)
  *B43K 29/08*  (2006.01)
  *B43K 29/00*  (2006.01)
  *G06F 3/038*  (2013.01)
  *G06F 3/041*  (2006.01)

(52) U.S. Cl.
  CPC ........ *G06F 3/0383* (2013.01); *G06F 3/03545* (2013.01); *G06F 3/0418* (2013.01)

(56) References Cited

U.S. PATENT DOCUMENTS

| | | |
|---|---|---|
| 8,847,930 B2 | 9/2014 | Boyd et al. |
| 9,244,543 B1 | 1/2016 | Sundara-Rajan et al. |
| 9,746,943 B1* | 8/2017 | Rost .................... G06F 3/03545 |
| 2003/0118391 A1* | 6/2003 | Adams ..................... B43K 8/22 401/116 |
| 2007/0130117 A1* | 6/2007 | Lapstun .............. G06F 16/9554 |
| 2007/0136283 A1* | 6/2007 | Silverbrook .......... G06F 16/332 |
| 2008/0252621 A1* | 10/2008 | Shipton ................ G01D 5/3473 345/179 |
| 2013/0106793 A1 | 5/2013 | Lai |
| 2014/0168177 A1 | 6/2014 | Mkrtchyan et al. |
| 2015/0015523 A1 | 1/2015 | Boyd et al. |
| 2017/0242501 A1* | 8/2017 | Tang .................. G06F 3/03545 |
| 2017/0249028 A1* | 8/2017 | Marshall ............. G06F 3/03545 |

\* cited by examiner

| VOLTAGE DROP (VOLTS) | NIB TYPE | SPECIFIC NIB TYPE |
|---|---|---|
| 0.5 | PHYSICAL MARKING | PEN |
| 1.0 | ELECTRONIC MARKING | ELECTRONIC STYLUS |
| 1.5 | PHYSICAL MARKING | PENCIL |

400

402 → (row 1)
404 → (row 2)
406 → (row 3)

FIG. 4

| CONNECTION PATTERN | | | | NIB TYPE | SPECIFIC NIB TYPE |
|---|---|---|---|---|---|
| FIRST CONTACT POSITION | SECOND CONTACT POSITION | THIRD CONTACT POSITION | FOURTH CONTACT POSITION | | |
| TRUE | TRUE | FALSE | FALSE | PHYSICAL MARKING | PEN |
| TRUE | FALSE | TRUE | FALSE | ELECTRONIC MARKING | ELECTRONIC STYLUS |
| TRUE | FALSE | FALSE | TRUE | PHYSICAL MARKING | PENCIL |

FIG. 6

STYLI

BACKGROUND

Certain writing devices or styli are designed for use with multiple interchangeable nibs. For example a stylus may interchangeably receive a physically marking nib designed to make physical marks on a physical medium (e.g., a pen nib, a pencil nib, a marker nib) and an electronic stylus nib which is not designed to make physical marks on a physical medium such as paper, but instead is designed to interact with an electronic device such as a tablet to generate marks on an electronic document or the like. The interchangeable nature of such nibs facilitates an environment where the same stylus may be utilized on multiple writing surfaces (e.g., paper, a whiteboard, an electronic tablet, etc.). For example, the electronic stylus nib may be used to write on and/or interact with a display of an interactive device (e.g., a tablet, smartphone, personal digital assistant, etc.), and the pen nib may be used to write on paper.

BRIEF DESCRIPTION OF THE DRAWINGS

FIG. 4 illustrates an example voltage correlation table utilized by the example nib identification sensor of FIGS. 2 and 3 and/or by the example processor of FIG. 2.

FIG. 6 illustrates an example connection pattern correlation table utilized by the example nib identification sensor of FIGS. 2 and 5 and/or by the example processor of FIG. 2.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Styli that are designed for use with multiple interchangeable nibs facilitate an environment where the same stylus may be utilized on multiple writing surfaces. The benefits associated with such interchangeability, however, may also pose risks, such as when an end user of the stylus forgets which nib is currently positioned in the stylus. For example, an end user may be of the belief that an electronic stylus nib is positioned in the stylus, when in fact one of a pen, pencil or marker nib is positioned in the stylus. While the electronic stylus nib is designed for writing on and/or interacting with a display of an interactive device, any one of the pen, pencil and/or marker nibs may cause damage to the same interactive device if such a nib contacts the display of the interactive device. Example styli disclosed herein generate alerts (e.g., alert notifications) to prevent an end user from unintentionally marking and/or contacting a display of an interactive device with a nib that is not intended for writing on and/or interacting with the display of the interactive device.

Figure 1:
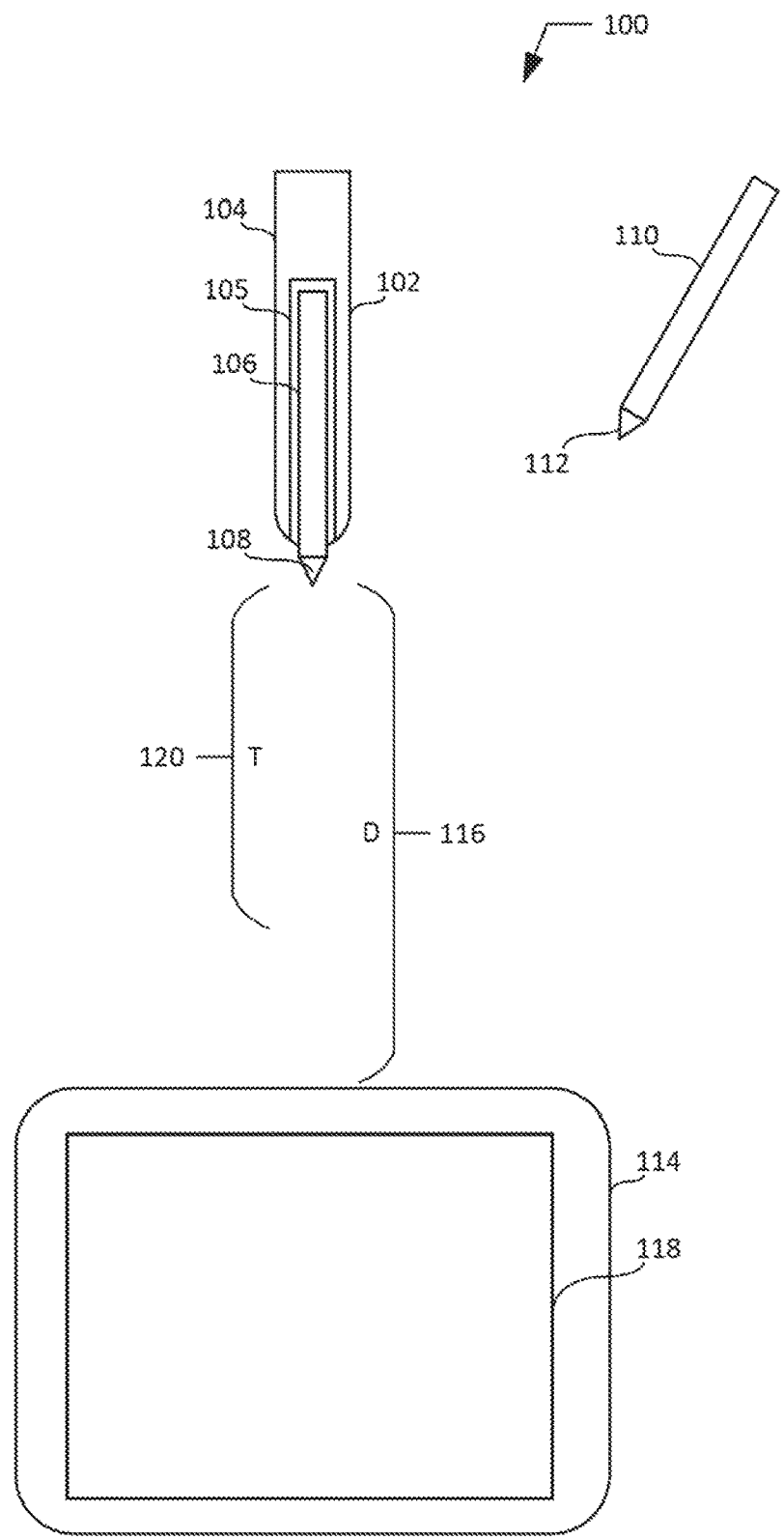
FIG. 1 illustrates an example stylus constructed in accordance with the teachings of this disclosure shown in an example environment of use.

FIG. 1 illustrates an example stylus 102 constructed in accordance with the teachings of this disclosure shown in an example environment 100 of use. In the illustrated example, the stylus 102 includes an example housing 104 and an example nib 106 received in an example cavity 105 of the housing 104. The nib 106 includes an example marking tip 108. In the illustrated example of FIG. 1, the marking tip 108 and/or, more generally, the nib 106 is a physically marking tip and/or nib. As used herein, a "physically marking" tip and/or nib is defined to be a tip or nib that transfers and/or applies a marking agent (e.g., ink, lead, graphite, etc.) to a physical medium (e.g., a surface, paper, a whiteboard, a chalkboard and/or other material) when the tip of the nib contacts the surface and/or material. Examples of physically marking nibs include, pens, pencils, markers, chalk, dry erase markers, and highlighters.

An example alternate nib 110 is shown in FIG. 1. The alternate nib 110 includes an alternate marking tip 112. In the illustrated example of FIG. 1, the alternate marking tip 112 and/or, more generally, the alternate nib 110 is an electronic marking tip and/or nib. As used herein, an "electronic marking" tip and/or nib is defined to be a tip or nib that is sensed by, provides input to, and/or communicates with an electronic display when the tip of the nib contacts the display, without physically transferring and/or applying a marking agent to the display. The fact that an electronic marking tip or nib could perhaps be used to scratch a surface by applying force to the surface does not make such a tip or nib a physically marking tip or nib, as no marking agent (e.g., ink, lead, graphite, etc.) is employed.

In the illustrated example of FIG. 1, the physically marking nib 106 is received in the cavity 105 of the housing 104 of the stylus 102. In some examples, the physically marking nib 106 is removably affixed in the cavity 105 of the housing 104 such that at least a portion of the marking tip 108 protrudes and/or extends from the housing 104. In other examples, the physically marking nib 106 is moveable between a first received position in which no portion of the marking tip 108 protrudes and/or extends from the housing 104, and a second received position in which at least a portion of the marking tip 108 protrudes and/or extends from the housing 104. In other words, the physically marking nib 106 is retractable (e.g., by telescoping into the cavity 105 of the housing 104). In some such examples, the physically marking nib 106 may be moved between the first and second received positions via an actuator such as, for example, a button, a switch, a lever or a dial.

In the illustrated example of FIG. 1, the electronic marking nib 110 is receivable in the cavity 105 of the housing 104 in lieu of the physically marking nib 106 described above. Thus, the housing 104 interchangeably receives the physically marking nib 106 and the electronic marking nib 110. In some examples, the housing 104 is configured to receive only one of the physically marking nib 106 or the electronic marking nib 110 at any given time. In some such examples, the physically marking nib 106 and the electronic marking nib 110 may be interchangeably positioned in the housing 104 (e.g., by sliding and/or threading either the physically marking nib 106 or the electronic marking nib 110 into the cavity 105 of the housing 104 via an opening in the housing 104). In other examples, the stylus 102 is structured to hold one nib in a use position and one or more other nibs in a storage position (e.g., at a non-writing end of the stylus). In other examples, a plurality of nibs, including for example the physically marking nib 106 and the electronic marking nib 110, may be positioned in the housing 104 of the stylus 102 in an interchanging and/or rotating barrel configuration. In such other examples, one of the plurality of nibs may be selected and/or actuated at any given time to cause at least a portion of the selected and/or actuated nib to protrude and/or extend from the housing 104 for contact with a medium.

In the illustrated example of FIG. 1, the marking tip 108 of the physically marking nib 106 secured in the stylus 102 is spaced apart from an example interactive device 114 by an example distance (D) 116. The interactive device 114 of this example includes an example display 118 that is configured to interact with an electronic marking nib (e.g., electronic marking nib 110). The interactive device 114 may be implemented as, for example, a smartphone, a tablet, a personal digital assistant, a laptop computer, a desktop computer, or any other electronic device having a display configured to interact with an electronic marking nib and/or electronic marking stylus. In some examples, the display 118 presents data (e.g., images, text, etc.) generated by an application executing on the interactive device 114.

In the illustrated example, when the marking tip 108 of the physically marking nib 106 of the stylus 102 contacts the display 118 of the interactive device 114, the distance (D) 116 between the stylus 102 and the interactive device 114 is zero. Contact between the marking tip 108 of the physically marking nib 106 of the stylus 102 and the display 118 of the interactive device 114 is undesirable. However, when the nib received in the housing 104 of the stylus 102 is the electronic marking nib 110, contact between the marking tip 112 of the electronic marking nib 110 and the display 118 of the interactive device 114 may be desirable. As shown in FIG. 1 and described in greater detail below, the stylus 102 determines the example distance (D) 116 between the stylus 102 and the interactive device 114, and compares the determined distance (D) 116 to an example threshold (T) 120 implemented by the stylus 102.

Figure 2:
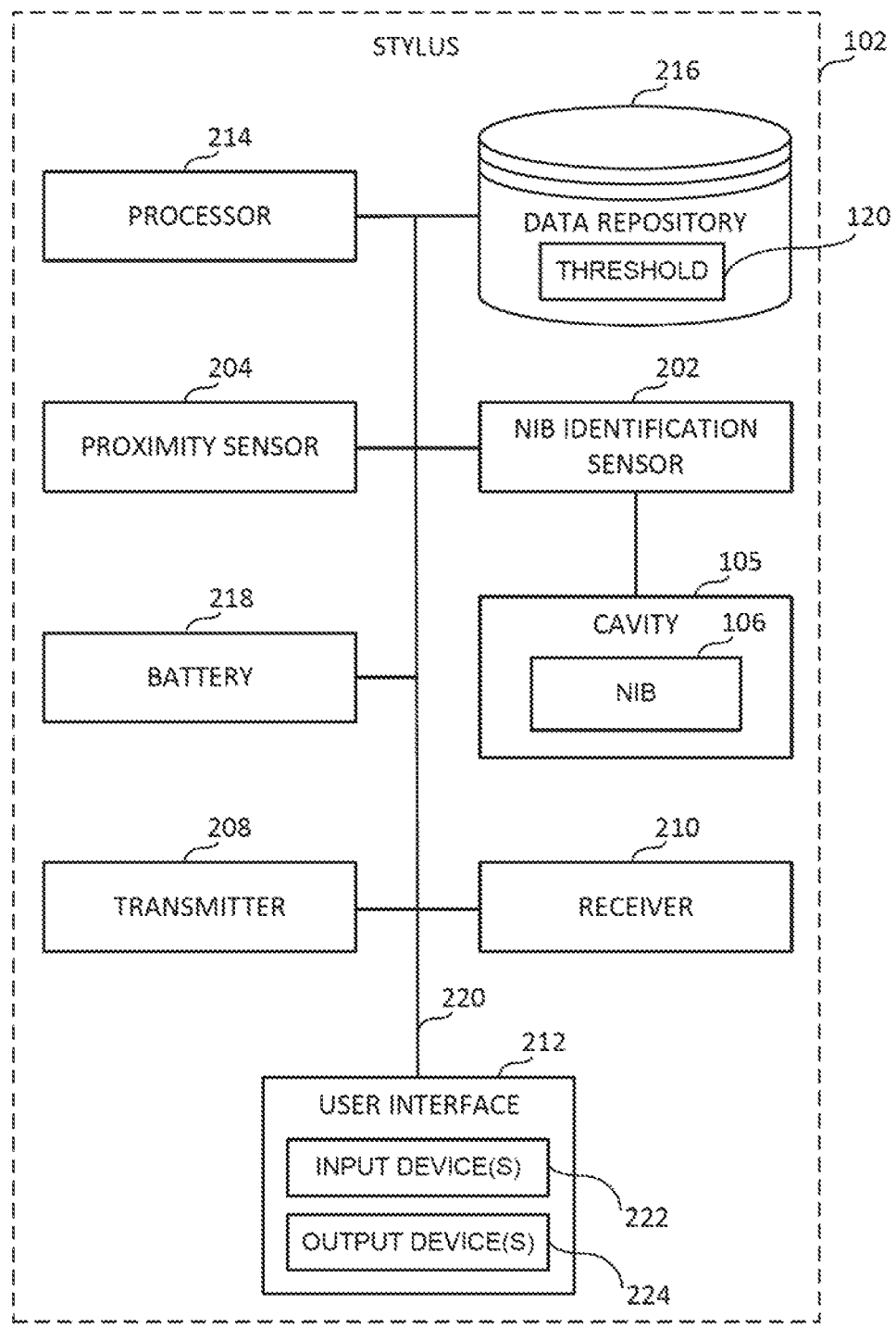
FIG. 2 is a block diagram of the example stylus of FIG. 1 constructed in accordance with the teachings of this disclosure.

FIG. 2 is a block diagram illustrating an example implementation of the example stylus 102 of FIG. 1. In the illustrated example of FIG. 2, the stylus 102 includes a cavity 105 for receiving a nib (e.g., the physically marking nib 106 or the electronic marking nib 110 of FIG. 1). In the example of FIG. 2, the physically marking nib 106 is shown in the cavity 105, but other nibs such as the electronic marking nib 110 might alternatively be disposed in the cavity 105. The example stylus 102 of FIG. 2 also includes an example nib identification sensor 202, an example proximity sensor 204, an example transmitter 208, an example receiver 210, an example user interface 212, an example processor 214, an example data repository 216, and an example battery 218. Some or all of these components are in communication via a bus 220. Other example implementations of the stylus 102 may include fewer or additional structures. Any or all of the example nib identification sensor 202, the example proximity sensor 204, the example transmitter 208, the example receiver 210, the example user interface 212, the example processor 214, the example data repository 216, and the example battery 218 may disposed on a printed circuit board (PCB). The housing 104 of the stylus 102 carries the example nib identification sensor 202, the example proximity sensor 204, the example transmitter 208, the example receiver 210, the example user interface 212, the example processor 214, the example data repository 216, and the example battery 218 of FIG. 2. In some examples, a PCB on which the components of FIG. 2 are mounted is dimensioned to fit within and be supported by the housing 104. Thus, in such examples, one or more of the example nib identification sensor 202, the example proximity sensor 204, the example transmitter 208, the example receiver 210, the example user interface 212, the example processor 214, the example data repository 216 and/or the example battery 218 is/are positioned within the housing 104 of the stylus 102.

In the illustrated example of FIG. 2, the example nib identification sensor 202 senses, measures and/or detects a physical structure (e.g., a key, a resistor, etc.), information and/or data associated with a nib (e.g., the physically marking nib 106) positioned in the cavity 105. This structure, information and/or data enables the example processor 214 to identify the received nib as either a physically marking nib (e.g., physically marking nib 106) or an electronic marking nib (e.g., electronic marking nib 110). As used herein, the term "nib information" refers to information and/or data that is sensed, measured and/or detected by the nib identification sensor 202. Once detected, the nib information may be stored in a computer-readable storage medium such as the example data repository 216 described below.

In some examples, the nib information is unique to the specific nib received in the cavity 105 of the housing 104 of the stylus 102. For example, if the example received nib is a physically marking nib (e.g., physically marking nib 106), the nib information may identify the received nib not only as a physically marking nib, but also as a specific type of physically marking nib, such as a pen, pencil, marker or highlighter. Thus, although the nib information may only be specific enough to enable the processor 214 of the stylus 102 to identify the received nib as either a physically marking nib or an electronic marking nib, in some examples the nib information is more specific to enable the processor 214 of the stylus 102 to uniquely identify the received nib in a manner that distinguishes and/or differentiates the received nib from the other nibs that may be interchangeably receivable within the housing 104 of the stylus 102.

In some examples, the nib (e.g., the physically marking nib 106 or the electronic marking nib 110) may include a memory for storing the nib information. In such examples, the stored nib information is accessible to the nib identification sensor 202 from the memory of the nib when the nib is positioned in the cavity 105 of the housing 104 of the stylus 102.

In some examples, the nib (e.g., the physically marking nib 106 or the electronic marking nib 110) may include a physical structure (e.g., a key, a resistor, etc.) from which the nib identification sensor 202 and/or the processor 214 of the stylus 102 derives the nib information. In such examples, the nib information is derived by the nib identification sensor 202 and/or the processor 214 when the nib is positioned in the cavity 105 of the housing 104 of the stylus 102.

Figure 3:
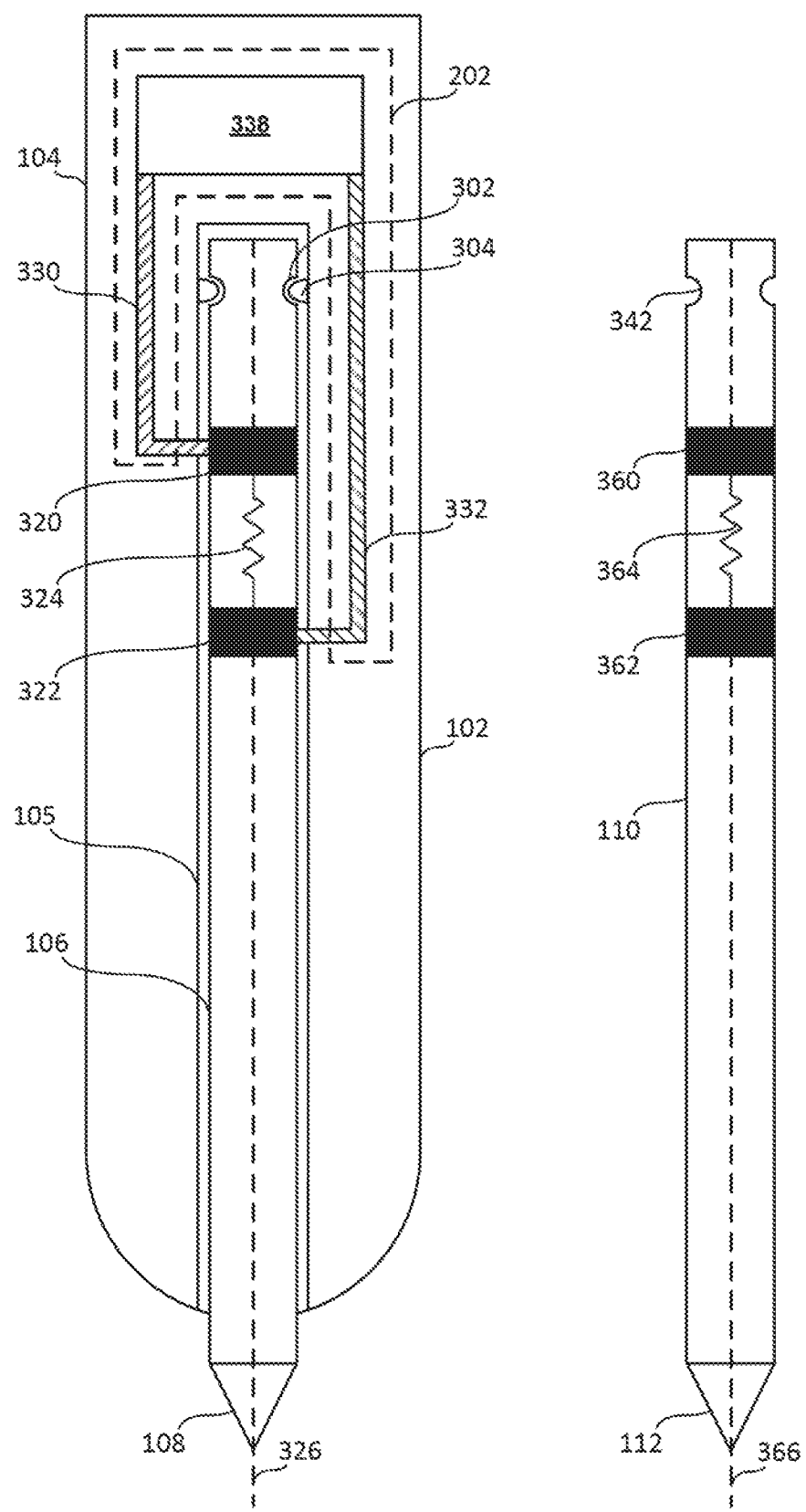
FIG. 3 illustrates the example nib identification sensor of FIG. 2 implemented to sense, measure and/or detect a resistance value and/or a voltage value associated with a received nib.

FIG. 3 illustrates an example implementation of the example nib identification sensor 202 of FIG. 2. In the example of FIG. 3, the nib identification sensor 202 is structured to sense, measure and/or detect a resistance value and/or a voltage value associated with a nib (e.g., physically marking nib 106 or electronic marking nib 110) received in the cavity 105 of the housing 104 of the stylus 102. In the example of FIG. 3, the physically marking nib 106 is shown in the cavity 105 of the housing 104 of the stylus 102, but other nibs such as the electronic marking nib 110 might alternatively be disposed in the cavity 105. In the illustrated example, the physically marking nib 106 includes a recess 302 that mates with a protrusion 304 in the cavity 105 when the physically marking nib 106 is disposed in the cavity 105. The mating of the recess 302 of the physically marking nib 106 with the protrusion 304 of the cavity 105 results in a friction fit that secures the physically marking nib 106 in the cavity 105 of the housing 104 of the stylus 102.

In the illustrated example of FIG. 3, the physically marking nib 106 includes an example first identifying contact 320, an example second identifying contact 322, and an example resistor 324. In this example, the first and second identifying contacts 320, 322 of the physically marking nib 106 are spaced apart from one another along a longitudinal axis 326 of the physically marking nib 106. In some examples, each of the first and second identifying contacts 320, 322 of the physically marking nib 106 is implemented as a conductive ring. The resistor 324 is positioned between and electrically connected to the first and second identifying contacts 320, 322 of the physically marking nib 106. The resistor 324 has an associated resistance value and/or voltage value (e.g., a voltage drop) that may be sensed, measured and/or detected.

In the illustrated example of FIG. 3, the nib identification sensor 202 includes an example first sensor contact 330, an example second sensor contact 332 and an example analog to digital (A/D) converter 338. When the physically marking nib 106 is positioned in the cavity 105 of the housing 104 of the stylus 102, the first sensor contact 330 of the nib identification sensor 202 contacts the first identifying contact 320 of the physically marking nib 106, and the second sensor contact 332 of the nib identification sensor 202 contacts the second identifying contact 322 of the physically marking nib 106. An electrical circuit is accordingly formed that includes the first and second identifying contacts 320, 322 of the physically marking nib 106, the resistor 324 of the physically marking nib 106, and the first and second sensor contacts 330, 332 of the nib identification sensor 202. The electrical circuit enables the nib identification sensor 202 to sense, measure and/or determine a resistance value and/or a voltage value (e.g., a voltage drop) associated with the resistor 324. For example, a constant voltage supplied to the nib identification sensor 202 by the example battery 218 of the stylus 102 may be passed through the first sensor contact 330 of the nib identification sensor 202, then through the first identifying contact 320 of the physically marking nib 106, then through the resistor 324 of the physically marking nib 106, then through the second identifying contact 322 of the physically marking nib 106, and then through the second sensor contact 332 of the nib identification sensor 202 to the A/D converter 338 of the nib identification sensor 202. In such an example, the A/D converter 338 of the nib identification sensor 202 senses, measures and/or determines a voltage value (e.g., a voltage drop) across the resistor 324 of the physically marking nib 106.

In some examples, a resistance value and/or a voltage value associated with a resistor (e.g., resistor 324) sensed, measured and/or detected by the nib identification sensor 202 enables the processor 214 of the stylus 102 to identify the nib received in the cavity 105 of the housing 104 of the stylus 102 as either a physically marking nib (e.g., physically marking nib 106) or an electronic marking nib (e.g., electronic marking nib 110). For example, the nib identification sensor 202 and/or the processor 214 of the stylus 102 may recognize the specific voltage value (e.g., a voltage drop) associated with the resistor 324 as associated with and/or indicative of a physically marking nib based on a correlation list, table and/or matrix. The correlation list, table and/or matrix utilized by the nib identification sensor 202 and/or the processor 214 may be of any format and may include any number of factors and/or fields. The correlation list, table and/or matrix may be stored in a computer-readable storage medium storing electronically readable data accessible to the processor 214 such as the example data repository 216 described below.

FIG. 4 illustrates an example voltage correlation table 400. In the illustrated example of FIG. 4, the voltage correlation table 400 includes a first voltage value 402 associated with a physically marking nib, and a second voltage value 404 associated with an electronic marking nib. In this example, if the nib identification sensor 202 of FIG. 3 senses and/or measures a voltage value (e.g., a voltage drop) associated with the example resistor 324 corresponding to the first voltage value 402 (e.g., 0.5 volts), the nib identification sensor 202 and/or the processor 214 accordingly determines, based on the voltage correlation table 400, that the nib received in the cavity 105 of the housing 104 of the stylus 102 including the resistor 324 is a physically marking nib (e.g., physically marking nib 106).

In some examples, the resistance value and/or voltage value associated with a resistor of any nib that is interchangeably receivable in the cavity 105 of the housing 104 of the stylus 102 is unique to a specific nib type (e.g., pen nib, pencil nib, electronic stylus nib, etc.). For example, the voltage correlation table 400 of FIG. 4 includes a first voltage value 402 associated with a physically marking nib that is a pen, a second voltage value 404 associated with an electronic marking nib that is an electronic stylus, and a third voltage value 406 associated with a physically marking nib that is a pencil.

Returning to the example of FIG. 3, the electronic marking nib 110 may alternatively be positioned in the cavity 105 of the housing 104 of the stylus 102. In the illustrated example, the electronic marking nib 110 includes a recess 342 configured to mate with the protrusion 304 in the cavity 105 when the electronic marking nib 110 is disposed in the cavity 105. In the illustrated example, the electronic marking nib 110 also includes an example first identifying contact 360, an example second identifying contact 362, and an example resistor 364. In this example, the first and second identifying contacts 360, 362 of the electronic marking nib 110 are spaced apart from one another along a longitudinal axis 366 of the electronic marking nib 110 such that the spacing between the first and second identifying contacts 360, 362 of the electronic marking nib 110 is substantially the same as the spacing between the first and second identifying contacts 320, 322 of the physically marking nib 106 of FIG. 3 described above. The resistor 364 is positioned between and electrically connected to the first and second identifying contacts 360, 362 of the electronic marking nib 110. The resistor 364 of the electronic marking nib 110 has an associated resistance value and/or voltage value that differs from the associated resistance value and/or voltage value of the resistor 324 of the physically marking nib 106.

When the electronic marking nib 110 is positioned in the cavity 105 of the housing 104 of the stylus 102, the first sensor contact 330 of the nib identification sensor 202 contacts the first identifying contact 360 of the electronic marking nib 110, and the second sensor contact 332 of the nib identification sensor 202 contacts the second identifying contact 362 of the electronic marking nib 110. An electrical circuit is accordingly formed that includes the first and second identifying contacts 360, 362 of the electronic marking nib 110, the resistor 364 of the electronic marking nib 110, and the first and second sensor contacts 330, 332 of the nib identification sensor 202. The electrical circuit enables the nib identification sensor 202 to sense, measure and/or determine a resistance value and/or a voltage value associated with the resistor 364. For example, a constant voltage supplied to the nib identification sensor 202 by the example battery 218 of the stylus 102 may be passed through the first sensor contact 330 of the nib identification sensor 202, then through the first identifying contact 360 of the electronic marking nib 110, then through the resistor 364 of the electronic marking nib 110, then through the second identifying contact 362 of the electronic marking nib 110, and then through the second sensor contact 332 of the nib identification sensor 202 to the A/D converter 338 of the nib identification sensor 202. In such an example, the A/D converter 338 of the nib identification sensor 202 senses, measures and/or determines a voltage value (e.g., a voltage drop) across the resistor 364 of the electronic marking nib 110.

The nib identification sensor 202 and/or the processor 214 of the stylus 102 may recognize the specific voltage value (e.g., a voltage drop) associated with the resistor 364 as associated with an electronic marking nib based on the example voltage correlation table 400 of FIG. 4. For example, if the nib identification sensor 202 of FIG. 3 senses and/or measures a voltage value (e.g., a voltage drop) associated with the example resistor 364 corresponding to the second voltage value 404 (e.g., 1.0 volts), the nib identification sensor 202 and/or the processor 214 accordingly determines, based on the voltage correlation table 400, that the nib received in the cavity 105 of the housing 104 of the stylus 102 including the resistor 364 is an electronic marking nib (e.g., electronic marking nib 110).

Figure 5:
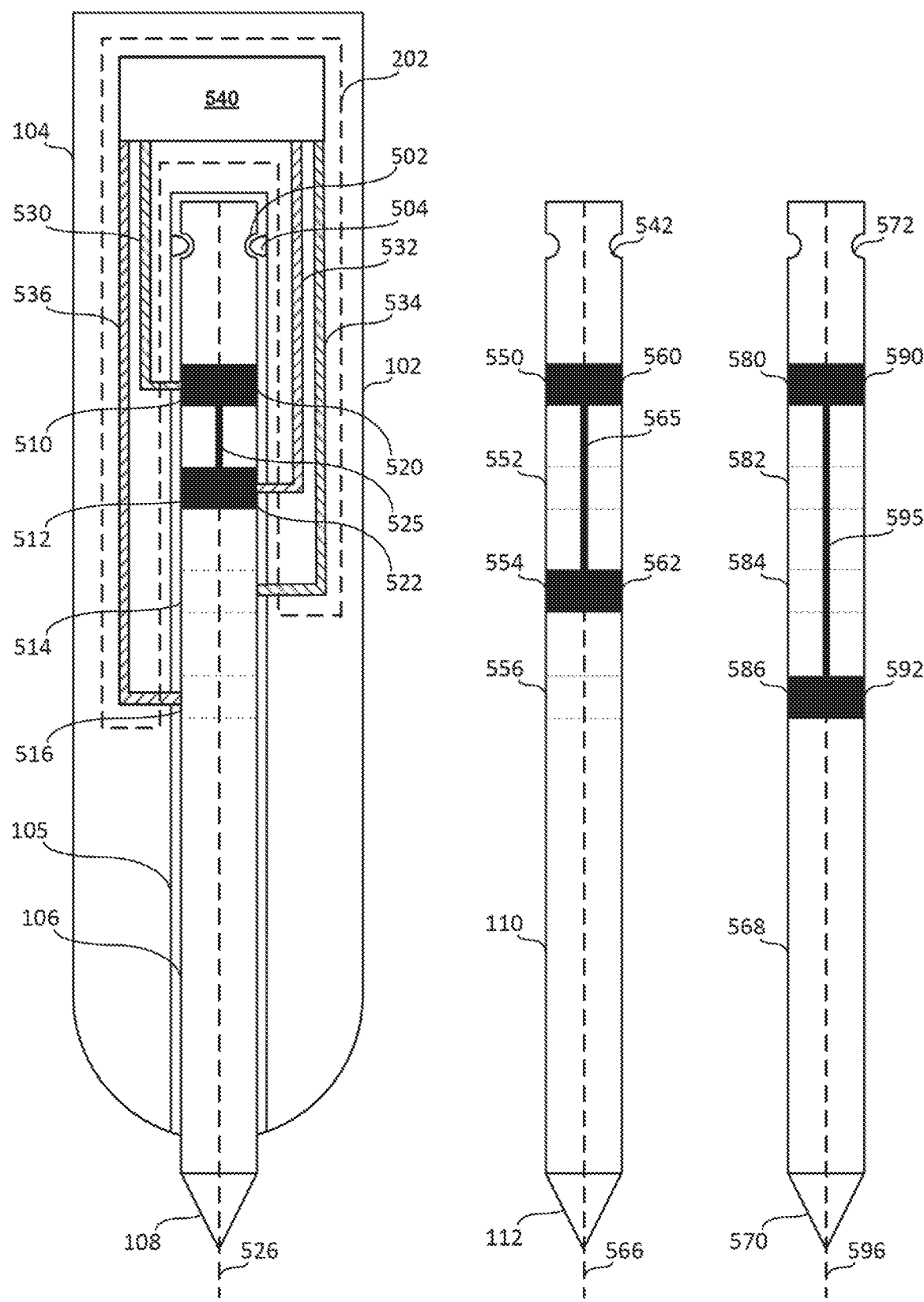
FIG. 5 illustrates the example nib identification sensor of FIG. 2 implemented to sense, measure and/or detect a voltage value and/or pattern associated with a received nib.

FIG. 5 illustrates another example implementation of the example nib identification sensor of FIG. 2. In the example of FIG. 5, the nib identification sensor 202 is structured to sense, measure and/or detect a pattern and/or key associated with a nib (e.g., physically marking nib 106 or electronic marking nib 110) received in the cavity 105 of the housing 104 of the stylus 102. In the example of FIG. 5, the physically marking nib 106 is shown in the cavity 105 of the housing 104 of the stylus 102, but other nibs such as the electronic marking nib 110 or the alternate nib 568 of FIG. 5 might alternatively be disposed in the cavity 105. In the illustrated example, the physically marking nib 106 includes a recess 502 that mates with a protrusion 504 in the cavity 105 when the physically marking nib 106 is disposed in the cavity 105. The mating of the recess 502 of the physically marking nib 106 with the protrusion 504 of the cavity 105 results in a friction fit that secures the physically marking nib 106 in the cavity 105 of the housing 104 of the stylus 102.

In the illustrated example of FIG. 5, the physically marking nib 106 includes an example first identifying contact position 510, an example second identifying contact position 512, an example third identifying contact position 514 and an example fourth identifying contact position 516. In this example, the first, second, third and fourth identifying contact positions 510, 512, 514, 516 of the physically marking nib 106 are spaced apart from one another along a longitudinal axis 526 of the physically marking nib 106. In the example of FIG. 5, the physically marking nib 106 also includes an example first identifying contact 520 located at the first identifying contact position 510 and an example second identifying contact 522 located at the second identifying contact position 512. In some examples, each of the first and second identifying contacts 520, 522 of the physically marking nib 106 is implemented as a conductive ring. In some examples, the first and second identifying contacts 520, 522 of the physically marking nib 106 are electrically coupled via, for example, a wire 525 positioned between and contacting the first and second identifying contacts 520, 522. The pattern and/or key established by the first identifying contact 520 being located at the first identifying contact position 510 and the second identifying contact 522 being located at the second identifying contact position 512 may be sensed, measured and/or detected.

In the illustrated example of FIG. 5, the nib identification sensor 202 includes an example first sensor contact 530, an example second sensor contact 532, an example third sensor contact 534, an example fourth sensor contact 536, and an example programmable logic circuit 540. The first, second, third and fourth sensor contacts 530, 532, 534, 536 of the nib identification sensor 202 are respectively aligned with corresponding ones of the first, second, third and fourth identifying contact positions 510, 512, 514, 516 of the physically marking nib 106 when the physically marking nib 106 is disposed in the cavity 105 of the housing 104 of the stylus 102. Thus, when the physically marking nib 106 is disposed in the cavity 105, the first sensor contact 530 of the nib identification sensor 202 contacts the first identifying contact 520 of the physically marking nib 106 located at the first identifying contact position 510, and the second sensor contact 532 of the nib identification sensor 202 contacts the second identifying contact 522 of the physically marking nib 106 located at the second identifying contact position 512. In the illustrated example, the physically marking nib 106 does not include an identifying contact located at either of the third or fourth identifying contact positions 514, 516. Accordingly, when the physically marking nib 106 is disposed in the cavity 105, the third sensor contact 534 of the nib identification sensor 202 is not in contact with an identifying contact at the third identifying contact position 514 of the physically marking nib 106, and the fourth sensor contact 536 of the nib identification sensor 202 is not in contact with an identifying contact at the fourth identifying contact position 516 of the physically marking nib 106.

Thus, when the physically marking nib 106 is disposed in the cavity 105, an electrical circuit is formed that includes the first and second identifying contacts 520, 522 of the physically marking nib 106, the wire 525 of the physically marking nib 106, and the first and second sensor contacts 530, 532 of the nib identification sensor 202. The electrical circuit enables the nib identification sensor 202 to sense and/or detect the presence or absence of a voltage value associated with the physically marking nib 106 at respective ones of the first, second, third and fourth sensor contacts 530, 532, 534, 536. For example, a constant voltage supplied to the nib identification sensor 202 by the example battery 218 of the stylus 102 may be passed through the first sensor contact 530 of the nib identification sensor 202, then through the first identifying contact 520 of the physically marking nib 106, then through the wire 525 of the physically marking nib 106, then through the second identifying contact 522 of the physically marking nib 106, and then through the second sensor contact 532 of the nib identification sensor 202 to the programmable logic circuit 540 of the nib identification sensor 202. In such an example, the programmable logic circuit 540 detects the presence of the applied voltage at the first and second sensor contacts 530, 532, and/or detects the absence of the applied voltage at the third and fourth sensor contacts 534, 536.

In some examples, the first, second, third and fourth sensor contacts 530, 532, 534, 536 are implemented as general purpose input output (GPIO) pins of the nib identification sensor 202. In such examples, the assignment of the first, second, third and fourth sensor contacts 530, 532, 534, 536 as either an input or an output is configurable via the programmable logic circuit 540. For example, the programmable logic circuit 540 may be configured to implement the first sensor contact 530 as an output pin to output a voltage from the example battery 218 to the physically marking nib 106, and further configured to implement each of the second, third and fourth sensor contacts 532, 534, 536 as input pins to receive the applied voltage from the output pin when an electrical connection is present between the output pin and the input pin. In some examples, the programmable logic circuit 540 may change the function assigned to a sensor contact and/or GPIO pin in the course of sensing and/or detecting the presence and/or absence of a pattern and/or key of electrical connections associated with a nib (e.g., physically marking nib 106) received in the cavity 105 of the housing 104 of the stylus 102.

In some examples, the pattern and/or key of electrical connections sensed, measured and/or detected by the nib identification sensor 202 enables the processor 214 of the stylus 102 to identify the nib received in the cavity 105 of the housing 104 of the stylus 102 as either a physically marking nib (e.g., physically marking nib 106) or an electronic marking nib (e.g., electronic marking nib 110). For example, the nib identification sensor 202 and/or the processor 214 of the stylus 102 may recognize the specific pattern and/or key established by the first identifying contact 520 being located at the first identifying contact position 510 and the second identifying contact 522 being located at the second identifying contact position 512 as associated with a physically marking nib based on a correlation list, table and/or matrix. The correlation list, table and/or matrix utilized by the nib identification sensor 202 and/or the processor 214 may be of any format and may include any number of factors and/or fields. The correlation list, table and/or matrix may be stored in a computer-readable storage medium storing electronically readable data accessible to the processor 214 such as the example data repository 216 described below.

FIG. 6 illustrates an example connection pattern correlation table 600. In the illustrated example of FIG. 6, the connection pattern correlation table 600 includes a first connection pattern 602 associated with a physically marking nib, and a second connection pattern 604 associated with an electronic marking nib. In this example, if the nib identification sensor 202 of FIG. 5 senses and/or detects the first identifying contact 520 being located at the first identifying contact position 510, the second identifying contact 522 being located at the second identifying contact position 512, no identifying contact being located at the third identifying contact position 514, and no identifying contact being located at the fourth identifying contact position 516 (e.g., the first connection pattern 602 of the connection pattern correlation table 600), the nib identification sensor 202 and/or the processor 214 accordingly determines, based on the connection pattern correlation table 600, that the nib received in the cavity 105 of the housing 104 of the stylus 102 is a physically marking nib (e.g., physically marking nib 106).

In some examples, the connection pattern associated with any nib that is interchangeably receivable in the cavity 105 of the housing 104 of the stylus 102 is unique to a specific nib type (e.g., pen nib, pencil nib, electronic stylus nib, etc.).

For example, the connection pattern correlation table 600 of FIG. 6 includes a first connection pattern 602 associated with a physically marking nib that is a pen, a second connection pattern 604 associated with an electronic marking nib that is an electronic stylus, and a third connection pattern 606 associated with a physically marking nib that is a pencil.

Returning to the example of FIG. 5, the electronic marking nib 110 may be positioned in the cavity 105 of the housing 104 of the stylus 102 in lieu of the physically marking nib 106 of FIG. 5 described above. In the illustrated example, the electronic marking nib 110 includes a recess 542 configured to mate with the protrusion 504 in the cavity 105 when the electronic marking nib 110 is disposed in the cavity 105. In the example of FIG. 5, the electronic marking nib 110 includes an example first identifying contact position 550, an example second identifying contact position 552, an example third identifying contact position 554 and an example fourth identifying contact position 556. In this example, the first, second, third and fourth identifying contact positions 550, 552, 554, 556 of the electronic marking nib 110 are spaced apart from one another along a longitudinal axis 566 of the electronic marking nib 110 such that the spacing between the first, second, third and fourth identifying contact positions 550, 552, 554, 556 of the electronic marking nib 110 is substantially the same as the spacing between the first, second, third and fourth identifying contacts positions 510, 512, 514, 516 of the physically marking nib 106 of FIG. 5 described above. In the example of FIG. 5, the electronic marking nib 110 also includes an example first identifying contact 560 located at the first identifying contact position 550 and an example second identifying contact 562 located at the third identifying contact position 554. In some examples, each of the first and second identifying contacts 560, 562 of the electronic marking nib 110 is implemented as a conductive ring. In some examples, the first and second identifying contacts 560, 562 of the electronic marking nib 110 are electrically coupled via, for example, a wire 565 positioned between and contacting the first and second identifying contacts 560, 562.

The pattern and/or key established by the first identifying contact 560 being located at the first identifying contact position 550 and the second identifying contact 562 being located at the third identifying contact position 554 may be sensed, measured and/or detected. For example, the first, second, third and fourth sensor contacts 530, 532, 534, 536 of the nib identification sensor 202 are respectively aligned with corresponding ones of the first, second, third and fourth identifying contact positions 550, 552, 554, 556 of the electronic marking nib 110 when the electronic marking nib 110 is disposed in the cavity 105 of the housing 104 of the stylus 102. Thus, when the electronic marking nib 110 is disposed in the cavity 105, the first sensor contact 530 of the nib identification sensor 202 contacts the first identifying contact 560 of the electronic marking nib 110 located at the first identifying contact position 550, and the third sensor contact 534 of the nib identification sensor 202 contacts the second identifying contact 562 of the electronic marking nib 110 located at the third identifying contact position 554. In the illustrated example, the electronic marking nib 110 does not include an identifying contact located at either of the second or fourth identifying contact positions 552, 556. Accordingly, when the electronic marking nib 110 is disposed in the cavity 105, the second sensor contact 532 of the nib identification sensor 202 is not in contact with an identifying contact at the second identifying contact position 552 of the electronic marking nib 110, and the fourth sensor contact 536 of the nib identification sensor 202 is not in contact with an identifying contact at the fourth identifying contact position 556 of the electronic marking nib 110.

Thus, when the electronic marking nib 110 is disposed in the cavity 105, an electrical circuit is formed that includes the first and second identifying contacts 560, 562 of the electronic marking nib 110, the wire 565 of the electronic marking nib 110, and the first and third sensor contacts 530, 534 of the nib identification sensor 202. The electrical circuit enables the nib identification sensor 202 to sense and/or detect the presence or absence of a voltage value associated with the electronic marking nib 110 at respective ones of the first, second, third and fourth sensor contacts 530, 532, 534, 536. For example, a constant voltage supplied to the nib identification sensor 202 by the example battery 218 of the stylus 102 may be passed through the first sensor contact 530 of the nib identification sensor 202, then through the first identifying contact 560 of the electronic marking nib 110, then through the wire 565 of the electronic marking nib 110, then through the second identifying contact 562 of the electronic marking nib 110, and then through the third sensor contact 534 of the nib identification sensor 202 to the programmable logic circuit 540 of the nib identification sensor 202. In such an example, the programmable logic circuit 540 detects the presence of the applied voltage at the first and third sensor contacts 530, 534, and/or detects the absence of the applied voltage at the second and fourth sensor contacts 532, 536.

In some examples, the pattern and/or key of electrical connections sensed, measured and/or detected by the nib identification sensor 202 enables the processor 214 of the stylus 102 to identify the nib received in the cavity 105 of the housing 104 of the stylus 102 as either a physically marking nib (e.g., physically marking nib 106) or an electronic marking nib (e.g., electronic marking nib 110) based on the example connection pattern correlation table 600 of FIG. 6. For example, if the nib identification sensor 202 of FIG. 5 senses and/or detects the first identifying contact 560 being located at the first identifying contact position 550, the second identifying contact 562 being located at the third identifying contact position 554, no identifying contact being located at the second identifying contact position 552, and no identifying contact being located at the fourth identifying contact position 556 (e.g., the second connection pattern 604 of the connection pattern correlation table 600), the nib identification sensor 202 and/or the processor 214 accordingly determines, based on the connection pattern correlation table 600, that the nib received in the cavity 105 of the housing 104 of the stylus 102 is an electronic marking nib (e.g., electronic marking nib 110).

FIG. 5 illustrates an example alternate nib 568. In this example, the alternate nib 568 may be positioned in the cavity 105 of the housing 104 of the stylus 102 in lieu of the physically marking nib 106 or the electronic marking nib 110 of FIG. 5 described above. In the example of FIG. 5, the alternate nib 568 is an alternate physically marking nib including an alternate physically marking tip 570 that is of a different marking type relative to the physically marking tip 108 of the physically marking nib 106. For example, the physically marking nib 106 may be a pen nib, while the alternate physically marking nib 568 may be a pencil nib. As shown in the example of FIG. 5, the alternate physically marking nib 568 includes a recess 572 configured to mate with the protrusion 504 in the cavity 105 when the alternate physically marking nib 568 is disposed in the cavity 105. In the example of FIG. 5, the alternate physically marking nib 568 includes an example first identifying contact position 580, an example second identifying contact position 582, an example third identifying contact position 584, and an example fourth identifying contact position 586. In this example, the first, second, third and fourth identifying contact positions 580, 582, 584, 586 of the alternate physically marking nib 568 are spaced apart from one another along a longitudinal axis 596 of the alternate physically marking nib 568 such that the spacing between the first, second, third and fourth identifying contact positions 580, 582, 584, 586 of the alternate physically marking nib 568 is substantially the same as the spacing between the first, second, third and fourth identifying contacts positions 510, 512, 514, 516 of the physically marking nib 106 of FIG. 5 described above. In the example of FIG. 5, the alternate physically marking nib 568 also includes an example first identifying contact 590 located at the first identifying contact position 580 and an example second identifying contact 592 located at the fourth identifying contact position 586. In some examples, each of the first and second identifying contacts 590, 592 of the alternate physically marking nib 568 is implemented as a conductive ring. In some examples, the first and second identifying contacts 590, 592 of the alternate physically marking nib 568 are electrically coupled via, for example, a wire 595 positioned between and contacting the first and second identifying contacts 590, 592.

The pattern and/or key established by the first identifying contact 590 being located at the first identifying contact position 580 and the second identifying contact 592 being located at the fourth identifying contact position 586 may be sensed, measured and/or detected. For example, the first, second, third and fourth sensor contacts 530, 532, 534, 536 of the nib identification sensor 202 are respectively aligned with corresponding ones of the first, second, third and fourth identifying contact positions 580, 582, 584, 586 of the alternate physically marking nib 568 when the alternate physically marking nib 568 is disposed in the cavity 105 of the housing 104 of the stylus 102. Thus, when the alternate physically marking nib 568 is disposed in the cavity 105, the first sensor contact 532 of the nib identification sensor 202 contacts the first identifying contact 590 of the alternate physically marking nib 568 located at the first identifying contact position 580, and the fourth sensor contact 536 of the nib identification sensor 202 contacts the second identifying contact 592 of the alternate physically marking nib 568 located at the fourth identifying contact position 586. In the illustrated example, the alternate physically marking nib 568 does not include an identifying contact located at either of the second or third identifying contact positions 582, 584. Accordingly, when the alternate physically marking nib 568 is disposed in the cavity 105, the second sensor contact 532 of the nib identification sensor 202 is not in contact with an identifying contact at the second identifying contact position 582 of the alternate physically marking nib 568, and the third sensor contact 534 of the nib identification sensor 202 is not in contact with an identifying contact at the third identifying contact position 584 of the alternate physically marking nib.

Thus, when the alternate physically marking nib 568 is disposed in the cavity 105, an electrical circuit is formed that includes the first and second identifying contacts 590, 592 of the alternate physically marking nib 568, the wire 595 of the alternate physically marking nib 568, and the first and fourth sensor contacts 530, 536 of the nib identification sensor 202. The electrical circuit enables the nib identification sensor 202 to sense and/or detect the presence or absence of a voltage value associated with the alternate physically marking nib 568 at respective ones of the first, second, third and fourth sensor contacts 530, 532, 534, 536. For example, a constant voltage supplied to the nib identification sensor 202 by the example battery 218 of the stylus 102 may be passed through the first sensor contact 530 of the nib identification sensor 202, then through the first identifying contact 590 of the alternate physically marking nib 568, then through the wire 595 of the alternate physically marking nib 568, then through the second identifying contact 592 of the alternate physically marking nib 568, and then through the fourth sensor contact 536 of the nib identification sensor 202 to the programmable logic circuit 540 of the nib identification sensor 202. In such an example, the programmable logic circuit 540 detects the presence of the applied voltage at the first and fourth sensor contacts 530, 536, and/or detects the absence of the applied voltage at the second and third sensor contacts 532, 534.

In some examples, the pattern and/or key of electrical connections sensed, measured and/or detected by the nib identification sensor 202 enables the processor 214 of the stylus 102 to identify the nib received in the cavity 105 of the housing 104 of the stylus 102 as either a physically marking nib (e.g., physically marking nib 106 or alternate physically marking nib 568) or an electronic marking nib (e.g., electronic marking nib 110) based on the example connection pattern correlation table 600 of FIG. 6. For example, if the nib identification sensor 202 of FIG. 5 senses and/or detects the first identifying contact 590 being located at the first identifying contact position 580, the second identifying contact 592 being located at the fourth identifying contact position 586, no identifying contact being located at the second identifying contact position 582, and no identifying contact being located at the third identifying contact position 584 (e.g., the third connection pattern 606 of the connection pattern correlation table 600), the nib identification sensor 202 and/or the processor 214 accordingly determines, based on the connection pattern correlation table 600, that the nib received in the cavity 105 of the housing 104 of the stylus 102 is a physically marking nib (e.g., alternate physically marking nib 568).

Returning to the illustrated example of FIG. 2, the example proximity sensor 204 senses, measures and/or detects a distance (e.g., the example distance (D) 116 described above) between the stylus 102 (and/or a portion of the stylus 102 such as the nib tip) and the interactive device 114 (and/or a portion of the interactive device 114 such as the display 118). In some examples, the proximity sensor 204 senses, measures and/or detects a distance between a marking tip of the received nib of the stylus 102 (e.g., marking tip 108 of physically marking nib 106) and the display 118 of the interactive device 114. The distance information and/or data that is sensed, measured and/or detected by the proximity sensor 204 may be stored in a computer-readable storage medium such as the example data repository 216 described below.

In some examples, the proximity sensor 204 may be implemented as wireless RF communication circuitry such as, for example, Bluetooth and/or RFID circuitry. In some such examples, the interactive device 114 includes corresponding RF communication circuitry (e.g., a Bluetooth transmitter and/or receiver, an RFID tag, etc.) that enables the interactive device 114 to communicate with and/or be paired to the proximity sensor 204 of the stylus 102. In such examples, RF communication between the interactive device 114 and the proximity sensor 204 of the stylus occurs via a communication protocol such as, for example, Bluetooth. In the illustrated example of FIG. 2, the example processor 214 implements a protocol stack corresponding to the communication protocol by which the proximity sensor 204 and/or the processor 214 of the stylus 102 communicates with the interactive device 114. In some examples, the protocol stack may be stored in a computer-readable storage medium such as the example data repository 216 described below.

When implemented as RF communication circuitry, the proximity sensor 204 senses, measures and/or detects values associated with a signal that is transmitted from the interactive device 114 to the stylus 102 (e.g., a signal strength value, or a travel time associated with the signal). The proximity sensor 204 correlates and/or translates the value derived from the transmitted signal to a distance between the stylus 102 and the interactive device 114. Different values derived from the transmitted signal sensed, measured and/or detected by the proximity sensor 204 correspond to different distances between the stylus 102 and the interactive device 114. Thus, by sensing, measuring and/or detecting values associated with the signal transmitted from the interactive device 114 to the stylus 102, the proximity sensor 204 determines the distance between the stylus 102 and the interactive device 114. For example, if the travel time associated with the transmitted signal is decreasing (a more recent measurement is of a shorter duration than a prior measurement), the stylus 102 is moving closer to the interactive device 114.

In other examples, the proximity sensor 204 may be implemented as an infrared proximity sensor. In such other examples, the proximity sensor 204 emits an infrared beam of electromagnetic radiation toward the interactive device 114 and senses, measures and/or detects a reflected signal associated with the emitted beam being returned to the proximity sensor 204. The reflected signal may, for example, have reflected from a surface of the interactive device 114. The proximity sensor 204 correlates and/or translates a value derived from the reflected signal (e.g., a travel time associated with the signal) to a distance between the stylus 102 and the interactive device 114. Different values derived from the reflected signal sensed, measured and/or detected by the proximity sensor 204 correspond to different distances between the stylus 102 and the interactive device 114. Thus, by sensing, measuring and/or detecting values associated with the reflected signal returned from the interactive device 114, the proximity sensor 204 determines the distance between the stylus 102 and the interactive device 114. For example, if the travel time associated with the reflected signal is decreasing (a more recent measurement is of a shorter duration than a prior measurement), the stylus 102 is moving closer to the interactive device 114.

In other examples, the proximity sensor 204 may be implemented as a luminosity sensor. In such other examples, the proximity sensor 204 senses, measures and/or detects an amount of ambient light (e.g., the amount of light present in a room in which the example stylus 102 is located. The proximity sensor 204 correlates and/or translates a change in the amount of measured ambient light to a distance between the stylus 102 and the interactive device 114 based on a known brightness associated with the display 118 of the interactive device 114. Different values derived from the amount of ambient light sensed, measured and/or detected by the proximity sensor 204 correspond to different distances between the stylus 102 and the interactive device 114. Thus, by sensing, measuring and/or detecting values associated with the amount of ambient light and based on a known brightness associated with the display 118 of the interactive device 114, the proximity sensor 204 determines the distance between the stylus 102 and the interactive device 114. For example, if the brightness value associated with the amount of ambient light increases by an amount that is indicative of the presence of the display 118 of the interactive device 114 (a more recent measurement is of a higher brightness indicative of the presence of the display 118, whereas a prior measurement is of a lower brightness providing no such indication), the stylus 102 is moving closer to and/or is in proximity to the interactive device 114.

In other examples, the proximity sensor 204 is implemented as a capacitive proximity sensor. In such examples, the proximity sensor 204 senses, measures and/or detects a capacitance associated with the display 118 of the interactive device 114 when the display 118 is within an operating range of the proximity sensor 204. By sensing, measuring and/or detecting the capacitance associated with the display 118 of the interactive device 114, the proximity sensor 204 determines the distance between the stylus 102 and the interactive device 114. For example, if the proximity sensor 204 senses a capacitance associated with the display 118 of the interactive device 114, the stylus 102 is in proximity to the interactive device 114 at a distance that is equal to or less than the operating range of the proximity sensor 204.

In other examples, the proximity sensor 204 is implemented as an inductive proximity sensor. In such examples, the proximity sensor 204 senses, measures and/or detects a magnetic target carried by and/or positioned within the interactive device 114 when the magnetic target is within an operating range of the proximity sensor 204. By sensing, measuring and/or detecting the magnetic target associated with the interactive device 114, the proximity sensor 204 determines the distance between the stylus 102 and the interactive device 114. For example, if the proximity sensor 204 senses the magnetic target associated with the interactive device 114, the stylus 102 is in proximity to the interactive device 114 at a distance that is equal to or less than the operating range of the proximity sensor 204.

In the illustrated example of FIG. 2, the example transmitter 208 transmits a signal to the interactive device 114. In some examples, the transmitter 208 may transmit a signal to the interactive device 114 corresponding to and/or based on an alert notification generated by the example processor 214 of the stylus 102, as described in greater detail below. In other examples, the transmitter 208 may be implemented as a component of, and/or to operate in conjunction with, the proximity sensor 204 described above to transmit an RF signal to the interactive device 114 that causes the interactive device 114 to return an RF signal to the stylus 102 to enable the proximity sensor 204 to sense, measure and/or detect a distance between the stylus 102 and the interactive device 114.

In the illustrated example of FIG. 2, the example receiver 210 collects, acquires and/or receives a signal from the interactive device 114. In some examples, the receiver 210 may receive a signal from the interactive device 114 in association with an alert notification generated by the example processor 214 of the stylus 102 and transmitted to the interactive device 114 by the example transmitter 208. In other examples, the receiver 210 may be implemented as a component of, and/or to operate in conjunction with, the proximity sensor 204 described above to receive an RF signal from the interactive device 114 to enable the proximity sensor 204 to sense, measure and/or detect a distance between the stylus 102 and the interactive device 114. Data identified and/or derived from the signal collected and/or received by the receiver 210 may be stored in a computer-readable storage medium such as the example data repository 216 described below.

In the illustrated example of FIG. 2, the example user interface 212 facilitates interactions and/or communications between an end user and the stylus 102. The example user interface 212 of FIG. 2 is implemented by one or more input device(s) 222 via which the user may input information and/or data to the stylus 102. For example, the user interface 212 may be a button, a microphone, and/or a touchscreen that enable(s) the end user to convey data and/or commands to the stylus 102.

The example user interface 212 of FIG. 2 also includes one or more output device(s) 224 via which the processor 214 of the stylus 102 presents information and/or data in visual, audible and/or tactile form to the user. For example, the user interface 212 may include a light emitting diode, a touchscreen, and/or a liquid crystal display for presenting visual information, a speaker for presenting audible information, and/or a haptic component for presenting tactile information. In some examples, one or more of the output device(s) 224 of the user interface 212 may provide a notification and/or message to the end user of the stylus 102 corresponding to and/or based on an alert notification generated by the example processor 214, as described in greater detail below. Data and/or information that is presented and/or received via the user interface 212 may be of any type, form and/or format, and may be stored in a computer-readable storage medium such as the example data repository 216 described below.

In the illustrated example of FIG. 2, the example processor 214 is implemented by a semiconductor device such as a microprocessor, controller or microcontroller. The processor 214 of this example is a silicon based hardware device. In the example of FIG. 2, the processor 214 obtains and/or accesses the nib information for the nib disposed in the cavity 105 of the housing 104 of the stylus 102 (e.g., the physically marking nib 106, the electronic marking nib 110, or the alternate physically marking nib 568) as sensed, measured and/or detected by the nib identification sensor 202. In some examples, the processor 214 obtains and/or accesses the nib information from the data repository 216. In other examples, the processor 214 obtains and/or accesses the nib information directly from the nib identification sensor 202.

The example processor 214 of FIG. 2 determines whether the received nib is a physically marking nib or an electronic marking nib based on the nib information. In some examples, the processor 214 performs such a determination by cross referencing the nib information with a correlation list, table and/or matrix, such as the voltage correlation table 400 of FIG. 4 or the connection pattern correlation table 600 of FIG. 6. For example, based on the correlation list, table and/or matrix, the processor 214 may determine that the nib information corresponds to the physically marking nib 106, the electronic marking nib 110, or the alternate physically marking nib 568 described above. The correlation list, table and/or matrix utilized by the example processor 214 may be of any format and may include any number of factors and/or fields. The correlation list, table and/or matrix may be stored in a computer-readable storage medium storing electronically readable data accessible to the processor 214 such as the example data repository 216 described below.

In the illustrated example of FIG. 2, the example processor 214 obtains and/or accesses the distance between the stylus 102 and the interactive device 114 as sensed, measured and/or detected by the proximity sensor 204. In some examples, the processor 214 obtains and/or accesses the distance from the data repository 216. In other examples, the processor 214 obtains and/or accesses the distance directly from the proximity sensor 204.

The example processor 214 of FIG. 2 compares the distance (D) to an example threshold (T) 120. The threshold 120 of the example of FIG. 2 is a computer-readable data and/or data structure stored in a computer-readable storage medium such as the example data repository 216 described below. In some examples, the value of the threshold 120 is selectable and/or adjustable via the user interface 212, which enables the end user of the stylus 102 to control the sensitivity by which the stylus 102 generates an alert notification.

When the processor 214 determines that the nib in the cavity 105 of the housing 104 of the stylus 102 is a physically marking nib (e.g., the physically marking nib 106 or the alternate physically marking nib 568) and also determines that the distance (D) 116 between the stylus 102 and the interactive device 114 satisfies the threshold (T) 120 (e.g., is below the threshold (T) 120), the processor 214 generates an alert notification. For example, in the environment 100 illustrated in FIG. 1, the example distance (D) 116 between the stylus 102 and the interactive device 114 may be eighteen inches, and the example threshold (T) 120 may be twelve inches. In such an example, the processor 214 does not generate an alert notification even though the nib within the cavity 105 of the housing 104 of the stylus 102 is a physically marking nib 106 because the distance (D) 116 between the stylus 102 and the interactive device 114 does not satisfy the threshold (T) 120. If, however, the stylus 102 is moved to a position where the distance (D) 116 between the stylus 102 and the interactive device 114 satisfies the threshold (T) 120 (is equal to or less than the threshold (T) 120) of twelve inches, the processor 214 generates an alert notification because the nib disposed in the cavity 105 of the housing 104 of the stylus 102 is a physically marking nib 106 and the distance (D) 116 between the stylus 102 and the interactive device 114 satisfies the threshold (T) 120, indicating undesirable contact between the physically marking nib (e.g., physically marking nib 106 or alternate physically marking nib 568) and the interactive device 114 may be imminent.

In some examples, the alert notification generated by the processor 214 causes an output device 224 of the user interface 212 of the stylus 102 to present and/or convey information to alert and/or warn the end user of the stylus 102 that he/she is at risk of contacting the interactive device 114 with a physically marking nib (e.g., physically marking nib 106 or alternate physically marking nib 568). For example, the alert notification generated by the processor 214 may cause a light emitting diode of the user interface 212 to power on and/or light up. As another example, the alert notification generated by the processor 214 may cause a speaker of the user interface 212 to emit an audible tone. As another example, the alert notification generated by the processor 214 may cause a haptic component of the user interface 212 to vibrate. As another example, the alert notification generated by the processor 214 may cause a liquid crystal display of the user interface 212 to present a textual and/or visual alert indication. As another example, the alert notification generated by the processor 214 may cause a functionality associated with an input device 222 of the user interface 212 to cease and/or to become disabled. Any combination of one or more of these user feedback alerts may be employed. In some examples, the user may select which of these alerts will be generated via the user interface 212 (e.g., some users may not want audible alerts and can select them off while maintaining haptic alerts, etc.)

In some examples, the alert notification generated by the processor 214 is transmitted via the transmitter 208 to the interactive device 114. In some examples, the alert notification transmitted to the interactive device 114 causes the interactive device 114 to present and/or convey information to alert and/or warn the end user of the stylus 102 that he/she is at risk of contacting the interactive device 114 with a physically marking nib (e.g., physically marking nib 106 or alternate physically marking nib 568). For example, the alert notification transmitted to the interactive device 114 may cause a light emitting diode of the interactive device 114 to power on and/or light up, may cause a speaker of the interactive device 114 to emit an audible tone, may cause a haptic component of the interactive device 114 to vibrate, and/or may cause the display 118 of the interactive device 114 to present a textual and/or visual alert indication. As another example, the alert notification transmitted to the interactive device 114 may cause a functionality associated with an application executing on the interactive device 114 to cease and/or to become disabled. As another example, the alert notification transmitted to the interactive device 114 may cause an application executing on the interactive device 114 to terminate and/or to become disabled.

In the illustrated example of FIG. 2, the example data repository 216 stores the nib information as sensed, measured and/or detected by the nib identification sensor 202. The data repository 216 of this example also stores correlation data that, in conjunction with the nib information, enables the processor 214 of the stylus 102 to determine whether the nib within the cavity 105 of the housing 104 of the stylus 102 is a physically marking nib (e.g., physically marking nib 106 or alternate physically marking nib 568) or an electronic marking nib (e.g., electronic marking nib 110). The data repository 216 of this example stores a protocol stack that enables the processor 214 to control, direct and/or facilitate communications between the stylus 102 and the interactive device 114. The example data repository 216 of FIG. 2 stores the distance(s) (D) sensed, measured and/or detected by the proximity sensor 204 and the threshold (T) 120 to which the processor 214 compares the distance(s) (D) sensed, measured and/or detected by the proximity sensor 204. The data repository 216 of the example of FIG. 2 also stores the alert notification(s) generated by the processor 214. The data repository 216 may store some or all of the data and/or data structures received via an input device 222 of the user interface 212 or presented via an output device 224 of the user interface 212. The data repository 216 may store some or all of the data and/or data structures transmitted by the transmitter 208 and/or received by the receiver 210.

The example data repository 216 of FIG. 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the example data repository 216 may be stored in any file and/or data structure format, organization scheme, and/or arrangement. The example data repository 216 is accessible to the example transmitter 208, the example user interface 212, and the example processor 214 of FIG. 2, and/or, more generally, to the example stylus 102 of FIGS. 1 and 2.

While an example manner of implementing the stylus 102 of FIG. 1 is illustrated in FIG. 2, one or more of the elements, processes and/or devices illustrated in FIG. 2 may be combined, divided, re-arranged, omitted, eliminated and/or implemented in any other way. Further, the example nib identification sensor 202, the example proximity sensor 204, the example transmitter 208, the example receiver 210, the example user interface 212, the example processor 214, the example data repository 216, the example battery 218 and/or, more generally, the example stylus 102 of FIG. 2 may be implemented by hardware, software, firmware and/or any combination of hardware, software and/or firmware. Thus, for example, any of the example nib identification sensor 202, the example proximity sensor 204, the example transmitter 208, the example receiver 210, the example user interface 212, the example processor 214, the example data repository 216, the example battery 218 and/or, more generally, the example stylus 102 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example nib identification sensor 202, the example proximity sensor 204, the example transmitter 208, the example receiver 210, the example user interface 212, the example processor 214, the example data repository 216 and/or the example battery 218 is/are hereby expressly defined to include a tangible computer readable storage device such as a flash memory or other memory device, etc. storing the software and/or firmware. Further still, the example stylus 102 of FIG. 1 may include one or more elements, processes and/or devices in addition to, or instead of, those illustrated in FIG. 2, and/or may include more than one of any or all of the illustrated elements, processes and devices.

Figure 7:
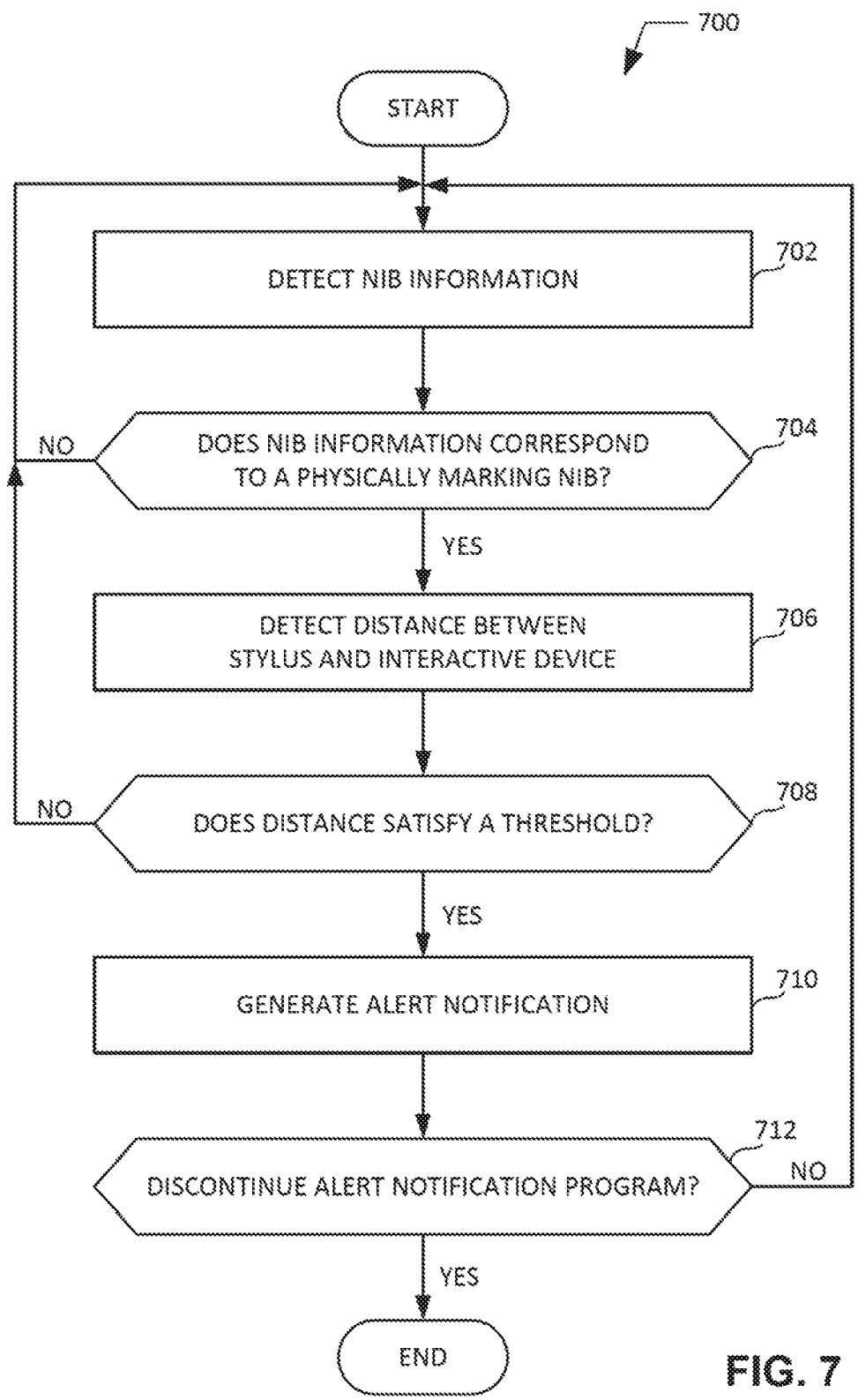
FIG. 7 is a flowchart representative of example machine-readable instructions that may be executed to implement the example stylus of FIGS. 1 and 2.

A flowchart representative of example machine readable instructions for implementing the stylus 102 of FIGS. 1 and 2 is shown in FIG. 7. In this example, the machine readable instructions comprise a program for execution by a processor such as the processor 214 shown in FIG. 2 and the example processor platform 800 discussed below in connection with FIG. 8. The program may be embodied in software stored on a tangible computer readable storage medium such as a flash memory or other memory device associated with the processor 214, but the entire program and/or parts thereof could alternatively be executed by a device other than the processor 214 and/or embodied in firmware or dedicated hardware. Further, although the example program is described with reference to the flowchart illustrated in FIG. 7, many other methods of implementing the example stylus 102 may alternatively be used. For example, the order of execution of the blocks may be changed, some or all of the blocks may be performed in parallel (e.g., by separate threads executing in parallel) and/or some of the blocks described may be changed, eliminated, or combined.

As mentioned above, the example processes of FIG. 7 may be implemented using coded instructions (e.g., computer and/or machine readable instructions) stored on a tangible computer readable storage medium such as a flash memory or other memory device in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is a flowchart representative of example machine-readable instructions 700 that may be executed to implement the example stylus 102 of FIGS. 1 and 2. The example program 700 of FIG. 7 begins when the example nib identification sensor 202 of FIG. 2 senses, measures and/or detects nib information for a nib disposed in the cavity 105 of the housing 104 of the stylus 102 (block 702). For example, the nib identification sensor 202 may sense, measure and/or detect nib information for the example physically marking nib 106, the example electronic marking nib 110, or the example alternate physically marking nib 568.

The example processor 214 of FIG. 2 determines whether the nib information sensed, measured and/or detected by the nib identification sensor 202 corresponds to a physically marking nib (block 704). For example, the processor 214 may determine that the nib disposed in the cavity 105 of the housing 104 of the stylus 102 is the example physically marking nib 106 based on the nib information sensed, measured and/or detected by the nib identification sensor 202. In some examples, the processor 214 may determine whether the nib received in the cavity 105 of the housing 104 of the stylus 102 is a physically marking nib (e.g., physically marking nib 106 or alternate physically marking nib 568) based in part on correlation data applied to the nib information. If the processor 214 determines at block 704 that the nib information does not correspond to a physically marking nib, control returns to block 702. If the processor 214 determines at block 704 that the nib information corresponds to a physically marking nib, control proceeds to block 706.

At block 706, the example proximity sensor 204 of FIG. 2 senses, measures and/or detects a distance (D) between the stylus 102 and an interactive device (block 706). For example, the proximity sensor 204 may sense, measure and/or detect the example distance (D) 116 between the stylus 102 and the example interactive device 114 of FIG. 1.

The example processor 214 of FIG. 2 determines whether the distance (D) sensed, measured and/or detected by the proximity sensor 204 satisfies a threshold (block 708). For example, the processor 214 may determine that the example stylus 102 is positioned at a distance (D) that is far enough away from the interactive device 114 such that the example threshold (T) 120 is not satisfied. If the processor 214 determines at block 708 that the distance (D) does not satisfy the threshold (T) 120, control returns to block 702. If the processor 214 determines at block 708 that the distance (D) satisfies the threshold (T) 120, control proceeds to block 710.

At block 710, the processor 214 of FIG. 2 generates an alert notification (block 710). In some examples, the alert notification generated by the processor 214 at block 710 may cause information to be conveyed and/or presented to alert and/or warn an end user of the stylus 102 that he/she is at risk of contacting the interactive device 114 with a physically marking nib (e.g., physically marking nib 106 or alternate physically marking nib 568).

The example processor 214 of FIG. 2 determines whether the example program 700 should be discontinued (block 712). For example, the processor 214 may receive a signal, message and/or instruction from the example user interface 212 of FIG. 2 indicating that the example program 700 should terminate and/or discontinue executing. If the processor 214 determines at block 712 that the example program 700 should continue executing, control returns to block 702. If the processor 214 determines at block 712 that the example program 700 should terminate and/or discontinue execution, the example program 700 ends.

Figure 8:
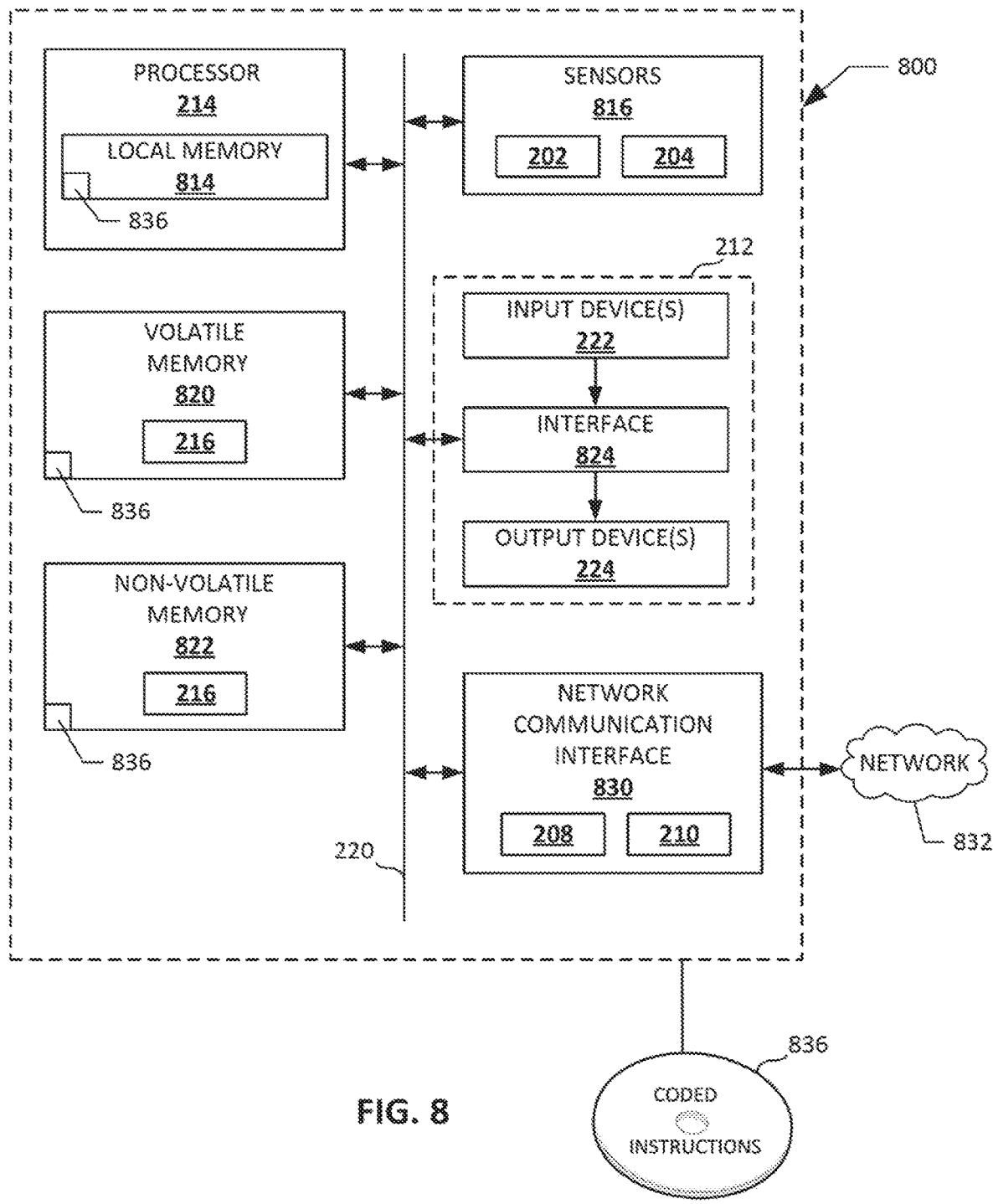
FIG. 8 is an example processor platform capable of executing the example instructions of FIG. 7 to implement the example stylus of FIGS. 1 and 2.

FIG. 8 is a block diagram of an example processor platform 800 capable of executing the instructions of FIG. 7 to implement the example stylus 102 of FIGS. 1 and 2. The processor platform 800 of the illustrated example includes a processor 214. The processor 214 of the illustrated example is hardware. For example, the processor 214 can be implemented by one or more integrated circuits, logic circuits, microprocessors or controllers from any desired family or manufacturer. The processor 214 of the illustrated example includes a local memory 814 (e.g., a cache).

The processor 214 of the illustrated example is in communication with one or more example sensors 816 via a bus 220. The example sensors 816 include the example nib identification sensor 202 and the example proximity sensor 204 of FIG. 2.

The processor 214 of the illustrated example is in communication with a main memory including a volatile memory 820 and a non-volatile memory 822 via the bus 820. The volatile memory 820 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 822 may be implemented by flash memory and/or any other desired type of memory device. Access to the main memory 820, 822 is controlled by a memory controller. In the illustrated example, the main memory 820, 822 includes the example data repository 216 of FIG. 2.

The processor platform 800 of the illustrated example also includes an interface circuit 824. The interface circuit 824 may be implemented by any type of interface standard, such as an Ethernet interface, a universal serial bus (USB), and/or a PCI express interface. In the illustrated example, one or more input device(s) 222 are connected to the interface circuit 824. The input device(s) 222 permit(s) a user to enter data and commands into the processor 214. The input device(s) can be implemented by, for example, an audio sensor, a camera (still or video), a keyboard, a button, a mouse, a touchscreen, a track-pad, a trackball, isopoint, a voice recognition system, a button, a microphone, and/or a liquid crystal display. One or more output device(s) 224 are also connected to the interface circuit 824 of the illustrated example. The output devices 224 can be implemented, for example, by a light emitting diode, an organic light emitting diode, a liquid crystal display, a touchscreen, a speaker and/or a haptic or tactile output device. The interface circuit 824 of the illustrated example may, thus, include a graphics driver such as a graphics driver chip and/or processor. In the illustrated example, the input device(s) 222, the output device(s) 224 and the interface circuit 824 collectively form the example user interface 212 of FIG. 2.

The processor platform 800 of the illustrated example also includes a network communication interface circuit 830. The network communication interface circuit 830 may be implemented by any type of interface standard, such as an Ethernet interface, a universal serial bus (USB), and/or a PCI express interface. In the illustrated example, the network interface circuit 830 includes the example transmitter 208 and the example receiver 210 of FIG. 2 to facilitate the exchange of data and/or signals with external machines (e.g., the interactive device 114 of FIG. 1) via a network 832 (e.g., a Bluetooth network, a cellular network, a wireless local area network (WLAN), a GPS network, etc.).

Coded instructions 836 implementing the machine-readable instructions of FIG. 7 may be stored in the local memory 814, in the volatile memory 820, in the non-volatile memory 822, and/or on a removable tangible computer readable storage medium such as a CD or DVD.

From the foregoing, it will be appreciated that above disclosed styli generate alerts to prevent unintentional marking of interactive devices with physical marks (e.g., ink marks, pencil marks, etc.).

An example stylus includes a housing and a processor. The housing is to interchangeably receive a physically marking nib and an electronic marking nib. The processor is carried by the housing. The processor is to determine a received nib is the physically marking nib. The processor is to determine a distance between the stylus and an interactive device satisfies a threshold. The processor is to generate an alert notification based on the received nib being the physically marking nib and the distance between the stylus and the interactive device satisfying the threshold.

In some disclosed examples, the stylus including a user interface to present the alert notification as at least one of a visual alert, an audible alert or a tactile alert. In some disclosed examples, the alert notification is to disable a functionality of a user interface of the stylus. In some disclosed examples, the stylus includes a transmitter to transmit a signal corresponding to the alert notification from the stylus to the interactive device. In some disclosed examples, the signal is to cause the interactive device to present at least one of a visual alert, an audible alert or a tactile alert. In some disclosed examples, the signal is to disable an application of the interactive device.

An example method includes detecting receipt of a physically marking nib in a stylus, the stylus to interchangeably receive the physically marking nib and an electronic marking nib. The example method includes determining, by executing an instruction with a processor, a distance between (a) at least one of the stylus and the physically marking nib, and (b) an interactive device satisfies a threshold. The example method includes generating, by executing an instruction with the processor, an alert in response to the received nib being the physically marking nib and the distance satisfying the threshold.

In some disclosed examples, the method includes presenting the alert via a user interface. In some disclosed examples, the method includes disabling a functionality of a user interface in response to the alert. In some disclosed examples, the method includes transmitting a signal corresponding to the alert from the stylus to the interactive device. In some disclosed examples, the signal is to cause the interactive device to present at least one of a visual alert, an audible alert or a tactile alert. In some disclosed examples, the signal is to cause the interactive device to disable an application of the interactive device.

An example tangible machine-readable storage medium includes example instructions that, when executed, cause a stylus to detect receipt of a physically marking nib. When executed, the example instructions cause the stylus to determine a distance to an interactive device satisfies a threshold. When executed, the example instructions cause the stylus to alert a user of the stylus in response to receipt of the physically marking nib and the distance satisfying the threshold.

In some disclosed examples, the instructions, when executed, cause the stylus to alert the user by at least one of a visual alert, an audible alert or a tactile alert. In some disclosed examples, the instructions, when executed, cause the stylus to disable a functionality of the stylus in response to receipt of the physically marking nib and the distance satisfying the threshold. In some disclosed examples, the instructions, when executed, cause the stylus to transmit a signal from the stylus to the interactive device. In some disclosed examples, the signal is to cause the interactive device to present at least one of a visual alert, an audible alert or a tactile alert. In some disclosed examples, the signal is to cause the interactive device to disable an application of the interactive device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

We claim:

1. A stylus, comprising:
   a housing to interchangeably receive a physically marking nib and an electronic marking nib;
   a sensor contact in the housing; and
   a processor carried by the housing, the processor to:
      determine a received nib is the physically marking nib based on electrical contact between the sensor contact and a conductive contact on the physically marking nib when the physically marking nib is received in the housing;
      determine a distance between the stylus and an interactive device satisfies a threshold; and
      generate an alert notification based on the received nib being the physically marking nib and the distance between the stylus and the interactive device satisfying the threshold.

2. The stylus of claim 1, further including a user interface to present the alert notification as at least one of a visual alert, an audible alert or a tactile alert.

3. The stylus of claim 1, wherein the alert notification is to disable a functionality of a user interface of the stylus.

4. The stylus of claim 1, further including a transmitter to transmit a signal corresponding to the alert notification from the stylus to the interactive device, the signal to cause the interactive device to present at least one of a visual alert, an audible alert or a tactile alert.

5. The stylus of claim 1, further including a transmitter to transmit a signal corresponding to the alert notification from the stylus to the interactive device, the signal to disable an application of the interactive device.

6. The stylus of claim 1, wherein the sensor contact is a first sensor contact and the conductive contact is a first conductive contact, further including a second sensor contact in the housing to electrically contact a second conductive contact on the physically marking nib when the physically marking nib is received in the housing, the processor to determine the received nib is the physically marking nib based on at least one of a resistance value or a voltage value associated with a resistor between the first and second conductive contacts.

7. The stylus of claim 6, wherein the processor is to determine the at least one of the resistance value or the voltage value is associated with the physically marking nib based on a table of resistance values or voltage values stored in a memory.

8. The stylus of claim 1, wherein the sensor contact is one of a plurality of sensor contacts in the housing and the conductive contact is one of a plurality of conductive contacts on the physically marking nib, the processor to determine the received nib is the physically marking nib based on electrical contact between certain ones of the sensor contacts and the conductive contacts on the physically marking nib.

9. The stylus of claim 8, wherein the processor is to determine the received nib is the physically marking nib based on a table of connection patterns between the sensor contacts and the conductive contacts stored in a memory.

10. A method, comprising:
    detecting receipt of a physically marking nib in a stylus based on contact between a sensor contact of the stylus and a conductive contact on the physically marking nib when the physically marking nib is received by the stylus, the stylus to interchangeably receive the physically marking nib and an electronic marking nib;
    determining, by executing an instruction with a processor, a distance between (a) at least one of the stylus and the physically marking nib, and (b) an interactive device satisfies a threshold; and
    generating, by executing an instruction with the processor, an alert in response to the received nib being the physically marking nib and the distance satisfying the threshold.

11. The method of claim 10, further including presenting the alert via a user interface.

12. The method of claim 10, further including disabling a functionality of a user interface in response to the alert.

13. The method of claim 10, further including transmitting a signal corresponding to the alert from the stylus to the interactive device, the signal to cause the interactive device to present at least one of a visual alert, an audible alert or a tactile alert.

14. The method of claim 10, further including transmitting a signal corresponding to the alert from the stylus to the interactive device, the signal to cause the interactive device to disable an application of the interactive device.

15. A tangible machine-readable storage medium comprising instructions that, when executed, cause a stylus to at least:
    detect receipt of a physically marking nib based on a proximity of a sensor contact of the stylus to a conductive contact on the physically marking nib when the physically marking nib is received by the stylus;
    determine a distance to an interactive device satisfies a threshold; and
    alert a user of the stylus in response to receipt of the physically marking nib and the distance satisfying the threshold.

16. The machine-readable storage medium of claim 15, wherein the instructions, when executed, cause the stylus to alert the user by at least one of a visual alert, an audible alert or a tactile alert.

17. The machine-readable storage medium of claim 15, wherein the instructions, when executed, cause the stylus to disable a functionality of the stylus in response to receipt of the physically marking nib and the distance satisfying the threshold.

18. The machine-readable storage medium of claim 15, wherein the instructions, when executed, cause the stylus to transmit a signal from the stylus to the interactive device, the signal to cause the interactive device to present at least one of a visual alert, an audible alert or a tactile alert.

19. The machine-readable storage medium of claim 15, wherein the instructions, when executed, cause the stylus to transmit a signal from the stylus to the interactive device, the signal to cause the interactive device to disable an application of the interactive device.

* * * * *